M. T. CHAPMAN.
WELL SINKING APPARATUS.
APPLICATION FILED JAN. 19, 1904. RENEWED FEB. 13, 1908.
1,044,349.
Patented Nov. 12, 1912.
8 SHEETS—SHEET 1.
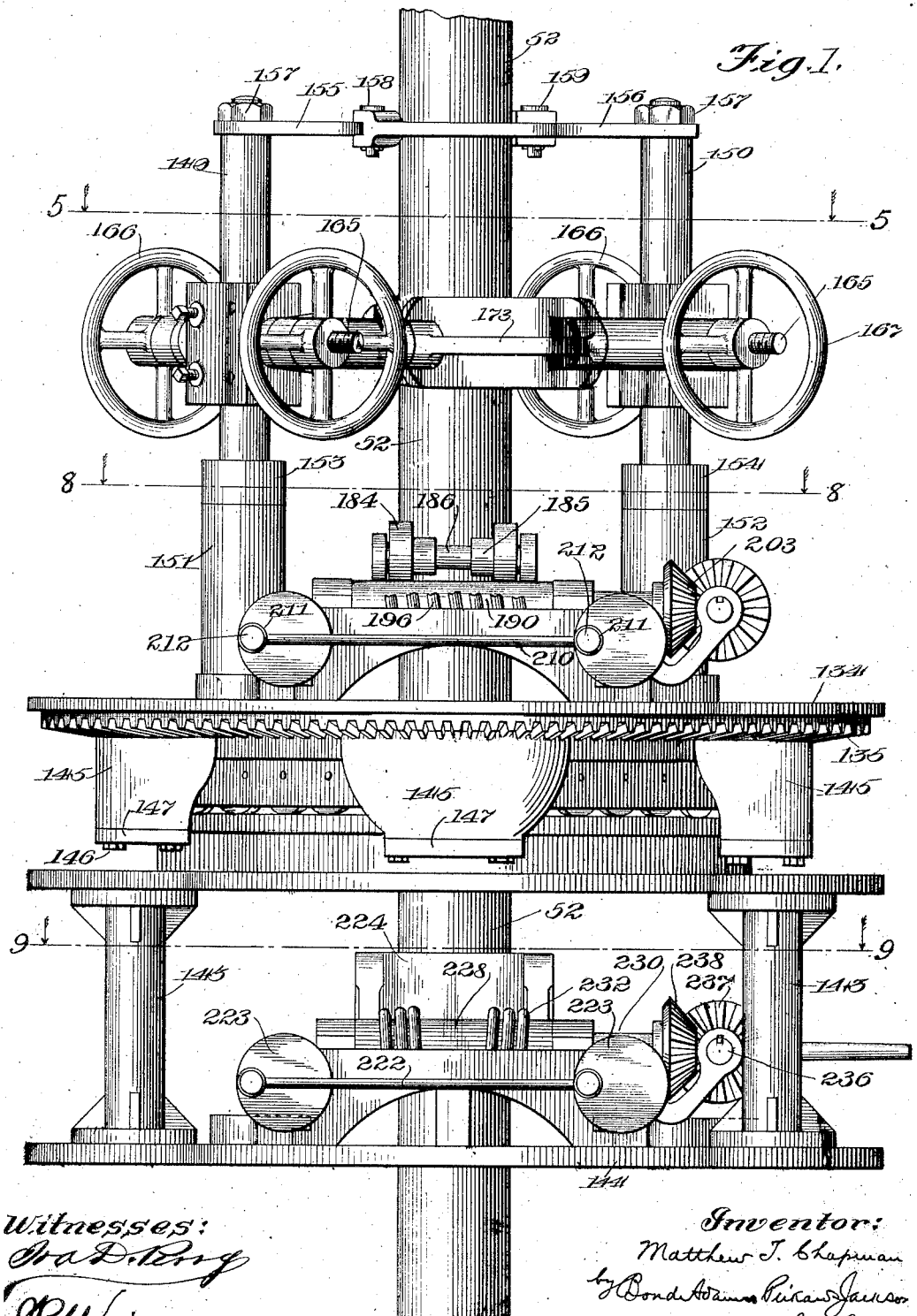

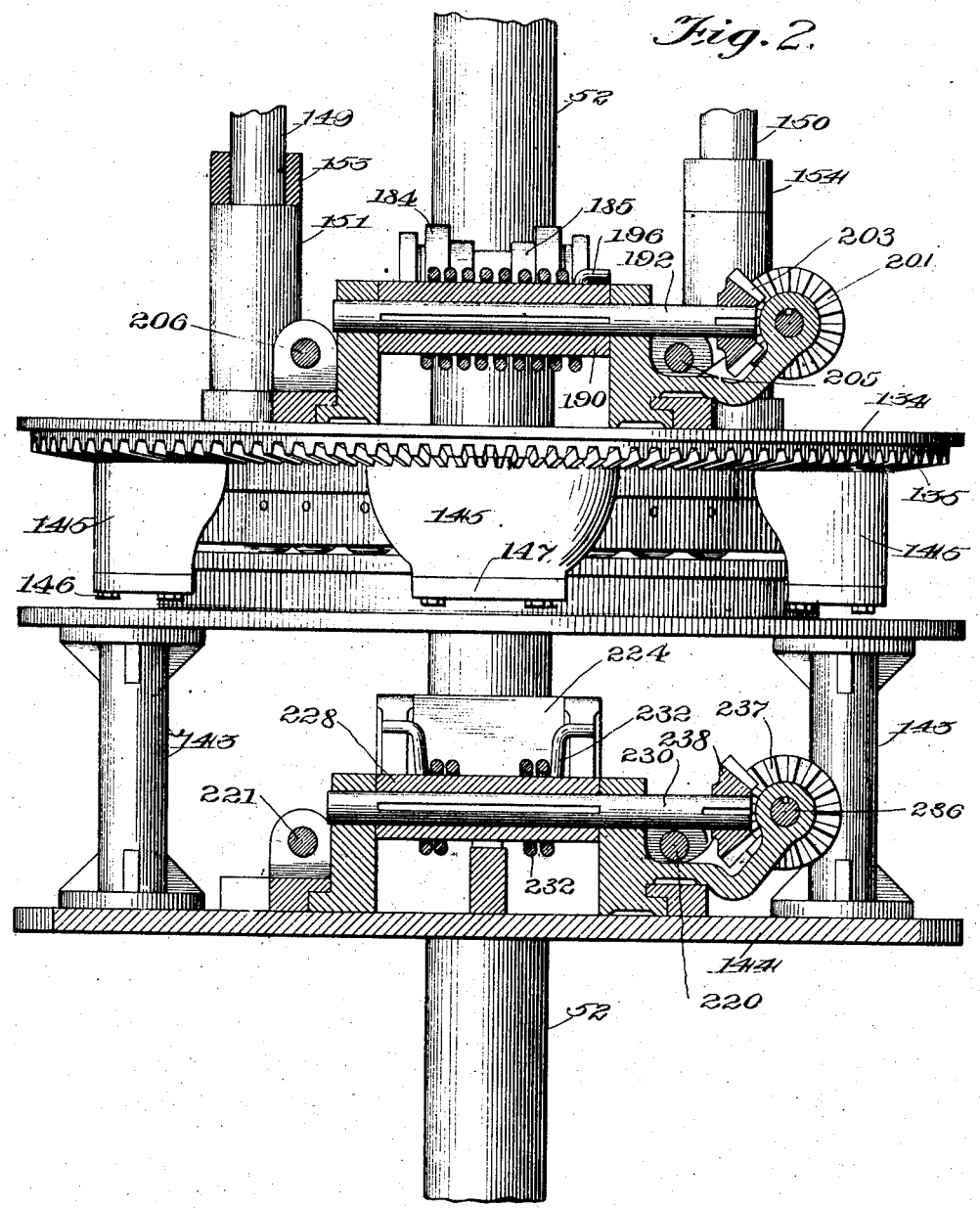

M. T. CHAPMAN.
WELL SINKING APPARATUS.
APPLICATION FILED JAN. 19, 1904. RENEWED FEB. 13, 1908.
1,044,349.
Patented Nov. 12, 1912.
8 SHEETS—SHEET 3.
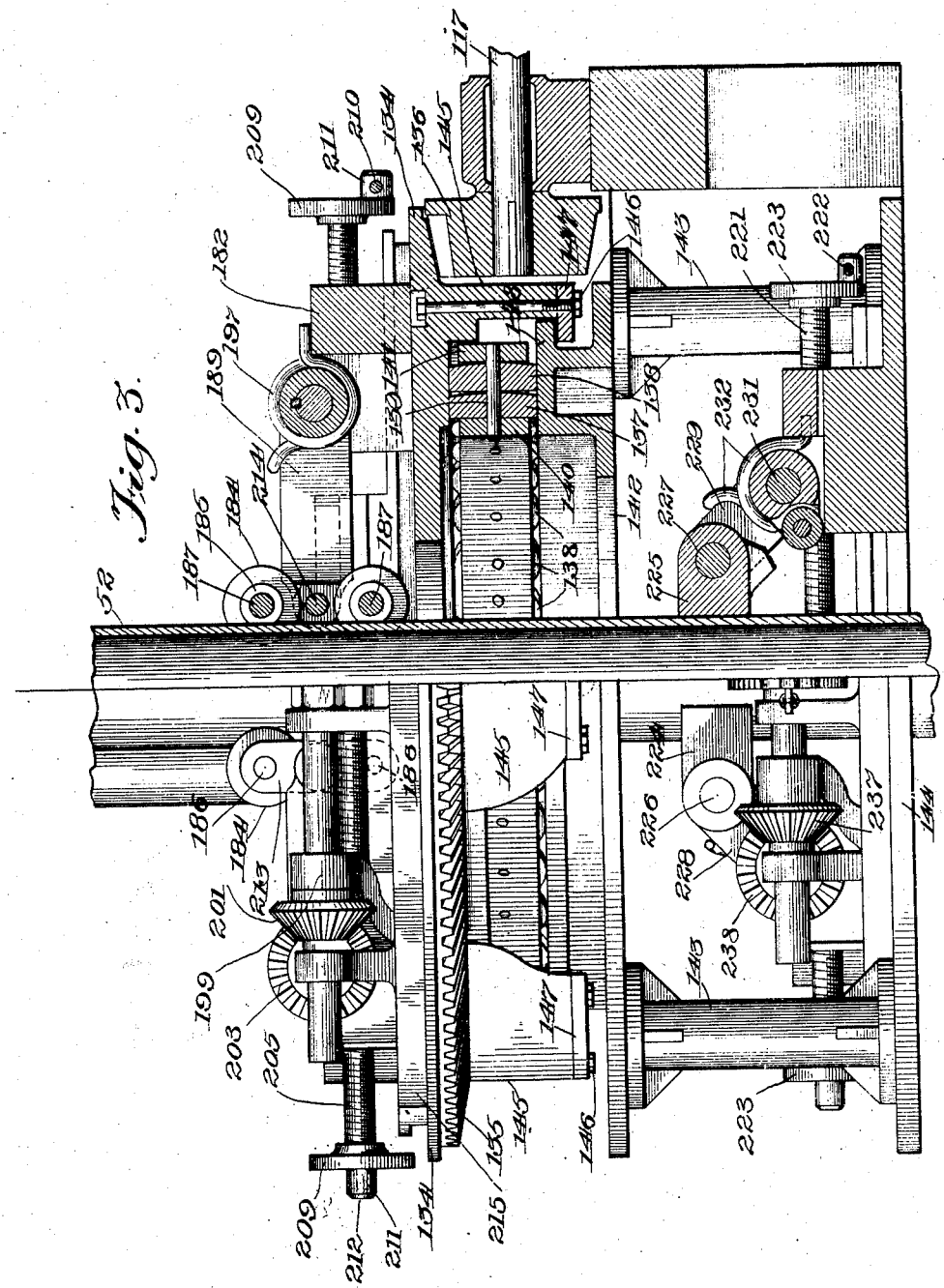

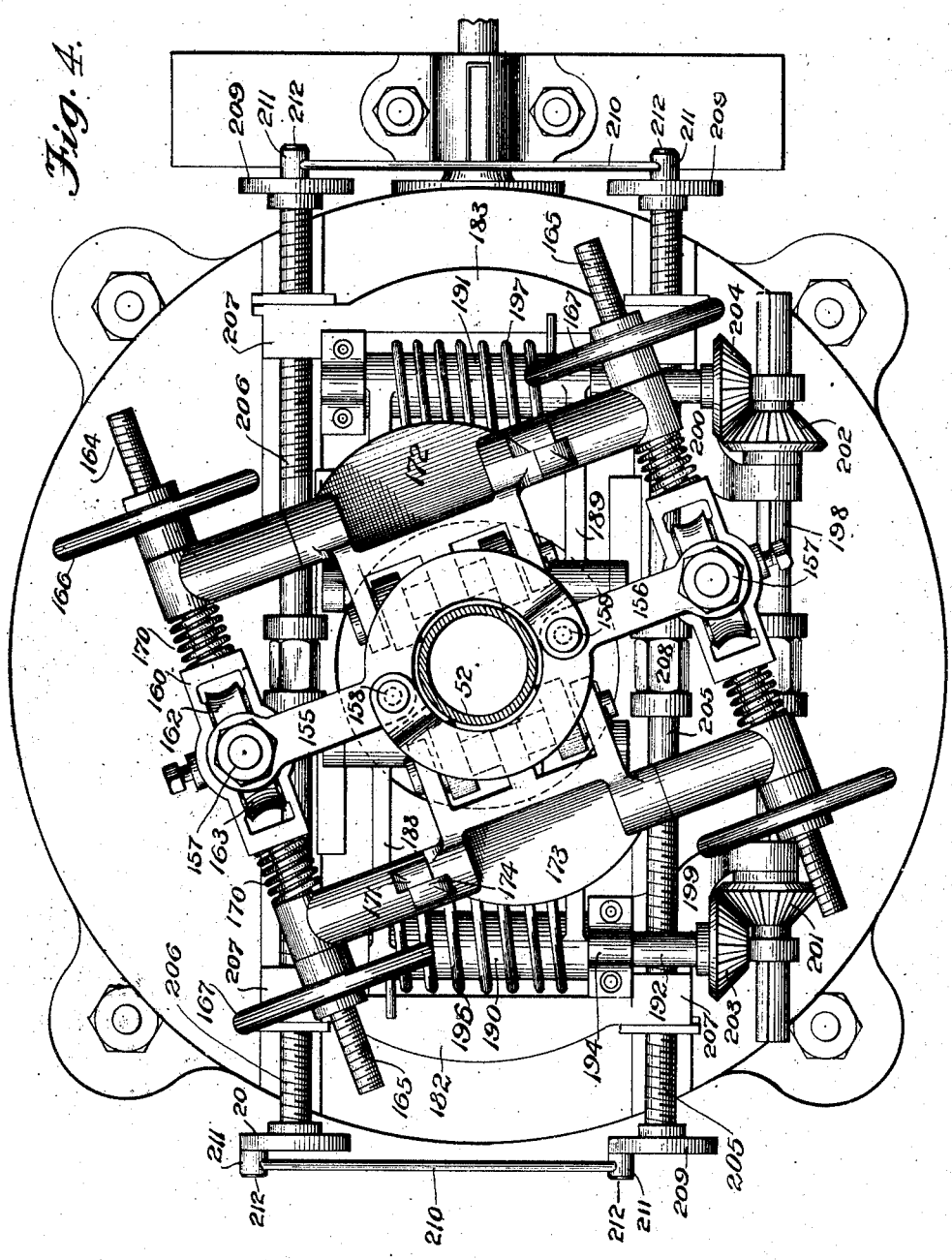

M. T. CHAPMAN.
WELL SINKING APPARATUS.
APPLICATION FILED JAN. 19, 1904. RENEWED FEB. 13, 1908.
1,044,349.
Patented Nov. 12, 1912.
8 SHEETS—SHEET 5.
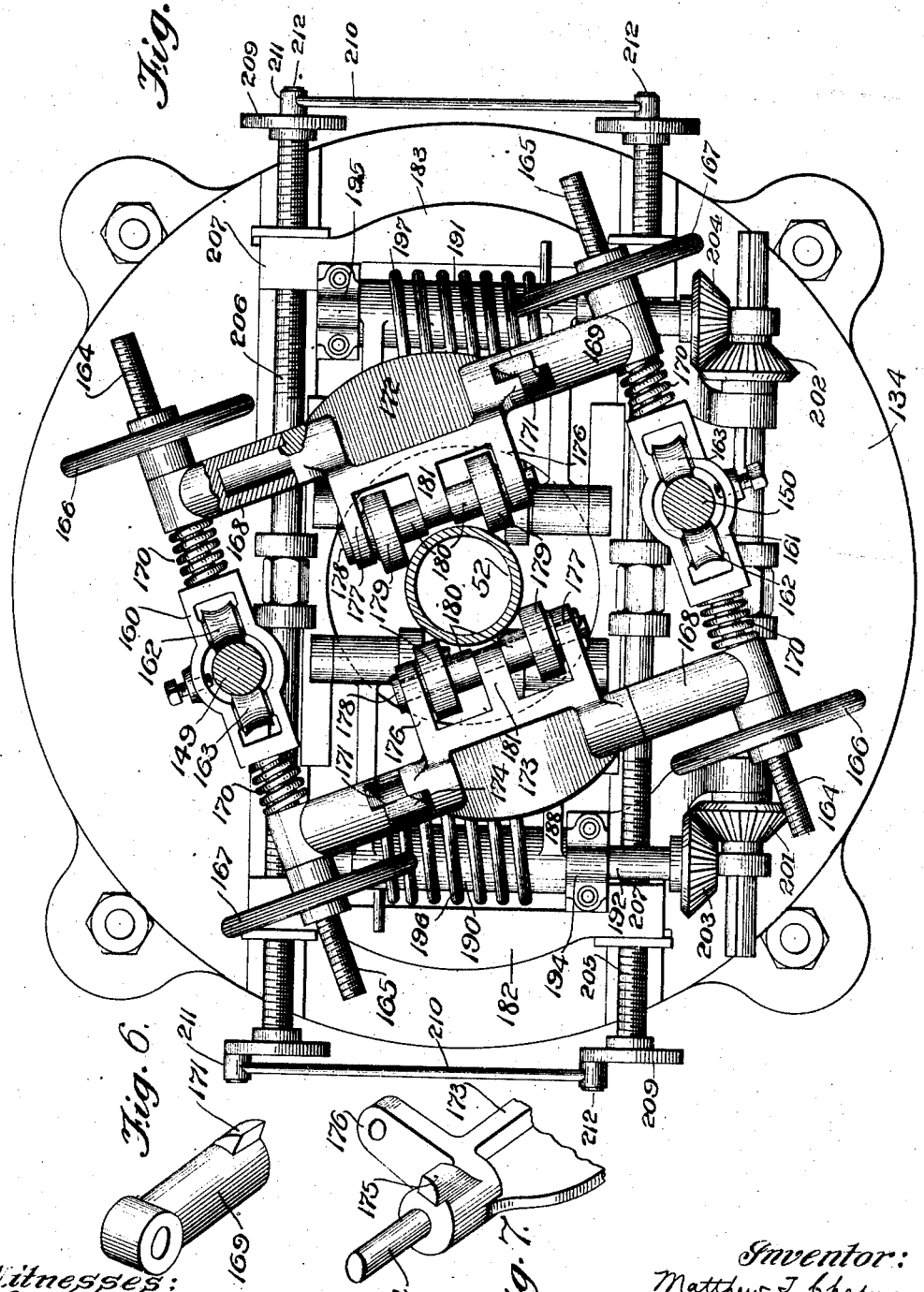

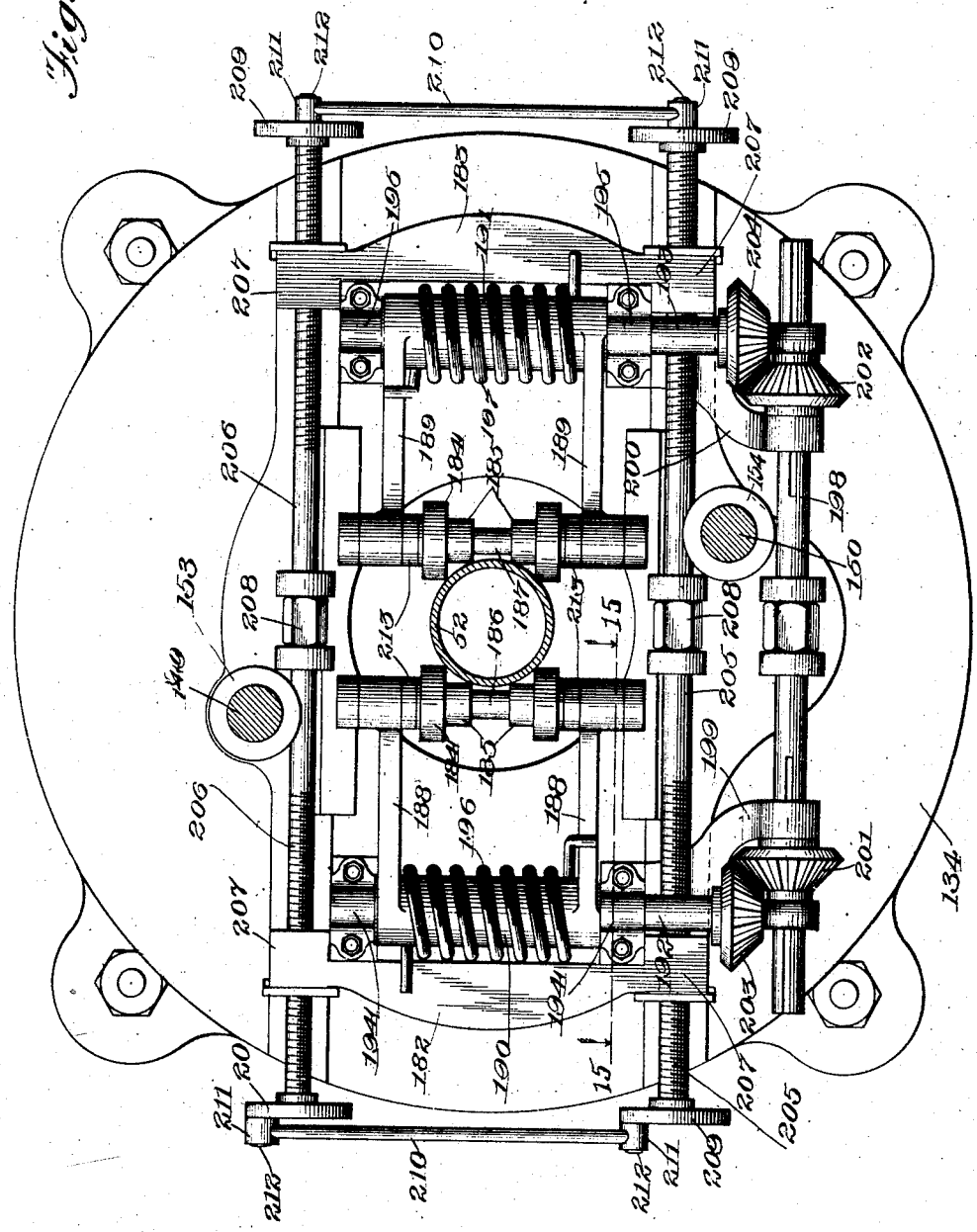

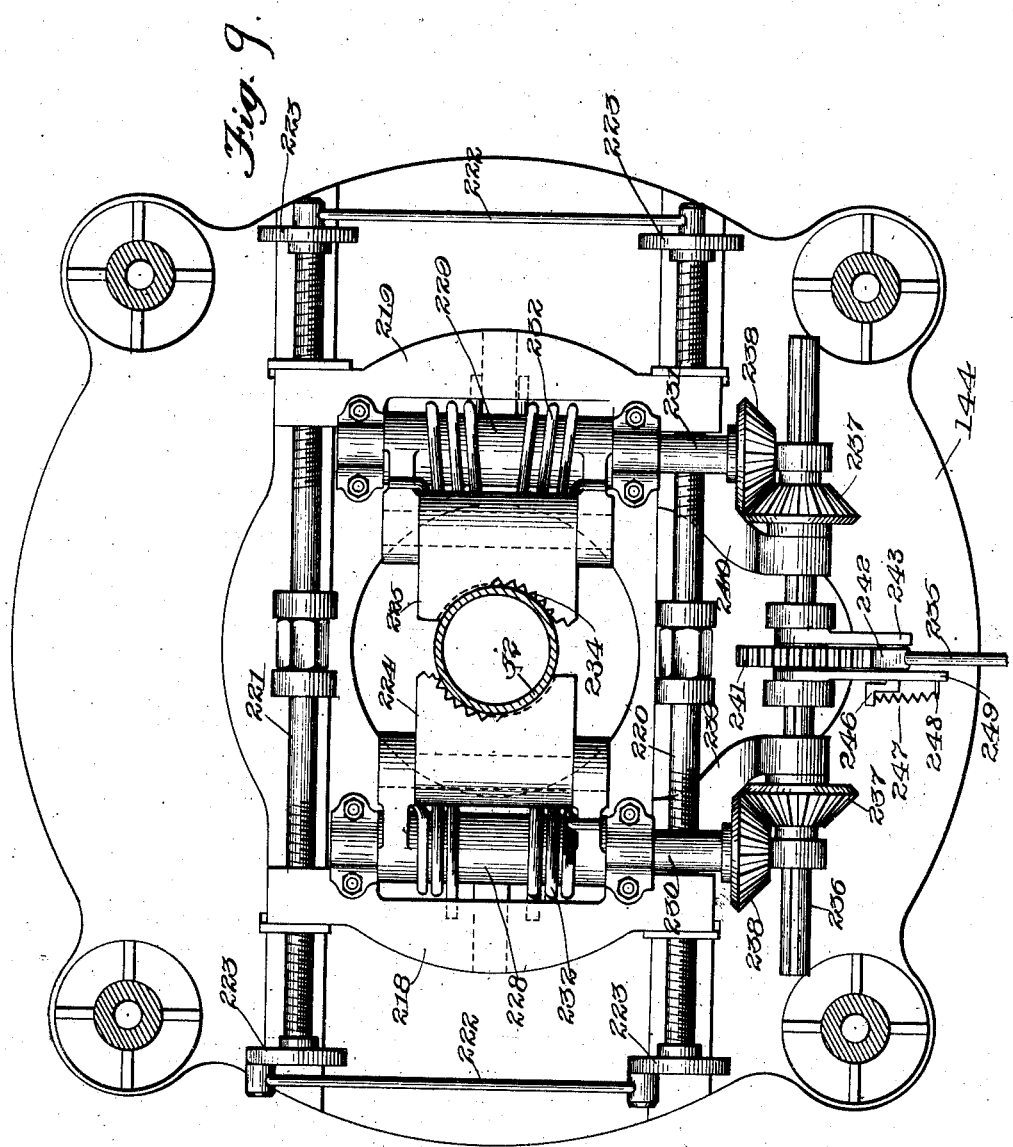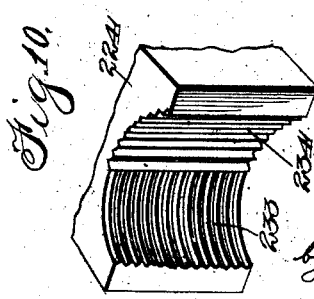

M. T. CHAPMAN.
WELL SINKING APPARATUS.
APPLICATION FILED JAN. 19, 1904. RENEWED FEB. 13, 1908.
1,044,349.
Patented Nov. 12, 1912.
8 SHEETS—SHEET 8.
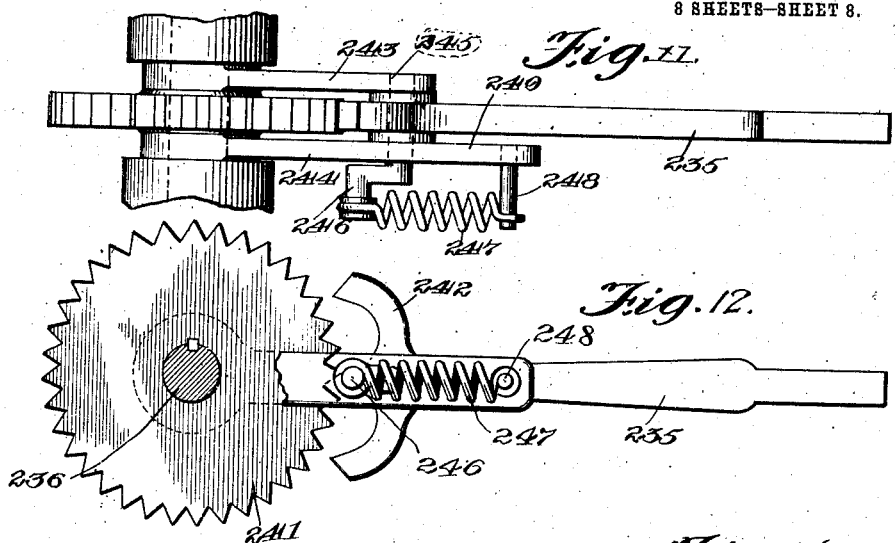
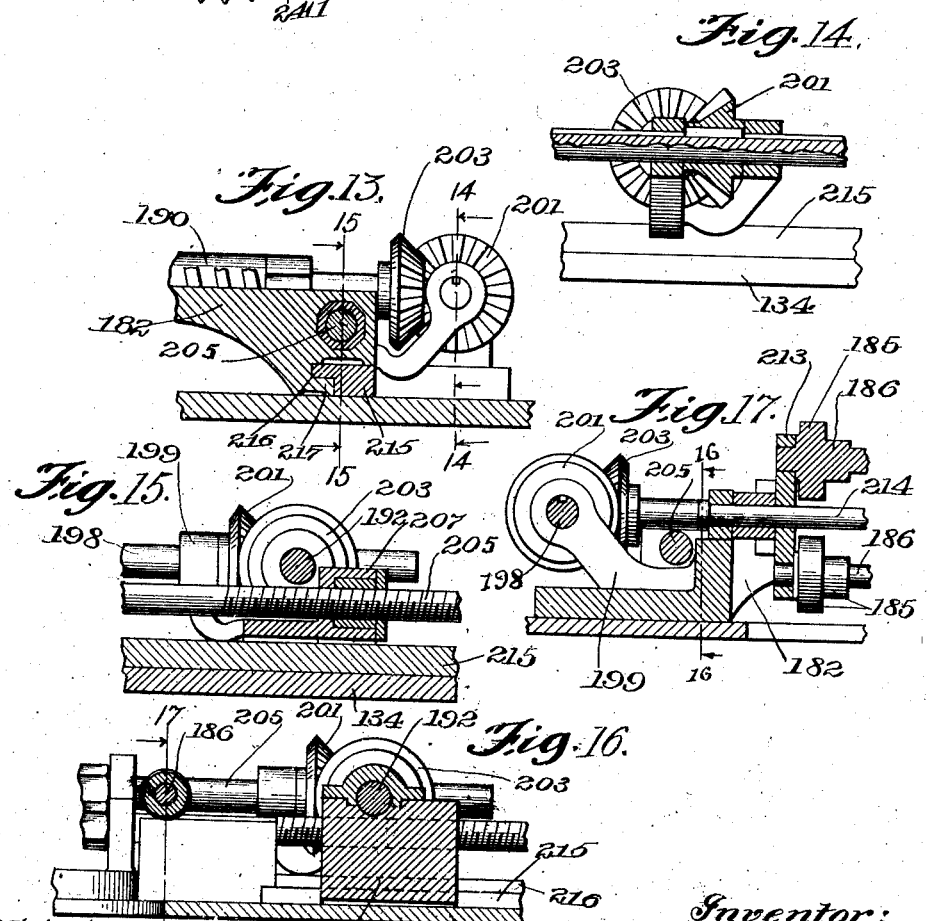
Inventor:
Matthew T. Chapman,
Witnesses:

UNITED STATES PATENT OFFICE.

MATTHEW THOS. CHAPMAN, OF AURORA, ILLINOIS, ASSIGNOR TO THE AMERICAN WELL WORKS, OF AURORA, ILLINOIS, A CORPORATION OF ILLINOIS.

WELL-SINKING APPARATUS.

1,044,349. Specification of Letters Patent. Patented Nov. 12, 1912.

Application filed January 19, 1904, Serial No. 189,770. Renewed February 13, 1908. Serial No. 415,668.

*To all whom it may concern:*

Be it known that I, MATTHEW THOS. CHAPMAN, a citizen of the United States, residing at Aurora, in the county of Kane and State of Illinois, have invented certain new and useful Improvements in Well-Sinking Apparatus, of which the following is a specification, reference being had to the accompanying drawings.

My invention relates to well-sinking apparatus in which the drilling mechanism is operated by a turn-table so constructed and arranged as to grip the well-tube, or other drilling-device, for rotating it and at the same time permit endwise movement of the pipe through such gripping-mechanism. My present application has to do particularly with certain improvements in mechanism for rotating the pipe, and supporting it at different stages of the boring operation.

What I regard as new is set forth in the claims.

In the accompanying drawings, Figure 1 is a side elevation of the mechanism for rotating and supporting the well-tube; Fig. 2 is a view partly in section, further illustrating certain parts shown in Fig. 1; Fig. 3 is a partial sectional view of the turntable, the gripping-devices mounted thereon, and the retaining-devices arranged thereunder; Fig. 4 is a plan view of the parts shown in Fig. 1; Fig. 5 is a horizontal section on line 5—5 of Fig. 1; Figs. 6 and 7 are perspective views of certain parts shown in Fig. 5; Fig. 8 is a horizontal section on line 8—8 of Fig. 1; Fig. 9 is a horizontal section on line 9—9 of Fig. 1; Fig. 10 is a perspective view, illustrating one of the retaining-blocks shown in Fig. 9; Fig. 11 is a partial plan view of the ratchet-mechanism for adjusting the retaining-devices shown in Fig. 9; Fig. 12 is a side view of the parts shown in Fig. 11; Fig. 13 is a sectional view, illustrating part of the mechanism for adjusting the rotary gripping devices; Fig. 14 is a section on line 14—14 of Fig. 13; Fig. 15 is a section on line 15—15 of Figs. 13 and 8; Fig. 16 is a section on line 16—16 of Fig. 17; and Fig. 17 is a section on line 17—17 of Fig. 16.

My present invention has to do with well-sinking apparatus in which the well is sunk by means of a tube carrying at its lower end a suitable bit, or other means, for cutting or grinding its way through the earth or rocky matter encountered,—said tube, which afterward forms the well-casing, being rotated by means of gripping-devices carried by a turntable. As in addition to rotating the well-tube it is frequently necessary to "jump" it, the gripping-devices are so arranged as to permit of the jumping of the well-tube without interfering with its rotation, and also to permit endwise movement of the well-tube independently of the gripping devices, so that the well-tube may descend into the earth as the well deepens. In practice a derrick is arranged over the site of the proposed well, and the well-tube is connected by a swivel-connection with a hoisting-apparatus, by which it may be raised for jumping purposes. Air and water connections are frequently provided for washing out the borings,—water being supplied from the surface until a sufficient supply is secured from the well iself, after which air is employed to effect the discharge of the water, carrying with it the borings.

My Patent No. 775,417 granted November 22, 1904, and my Patent No. 833,200 granted Oct. 16, 1906, embody certain of the features above mentioned, and my present application, in part, is for certain improvements upon the constructions embodied in my said applications. Other features hereinafter set forth are generic in character. I wish it to be understood, therefore, that the claims hereinafter made are generic in character and are to be construed broadly, except in so far as they particularly include specific features of construction.

Referring to the drawings,—52 indicates a well-tube.

134 indicates the turntable, which carries the gripping-devices for gripping the well-tube for rotating it. As shown in Figure 1, the turntable is provided with an annular rack 135 on its under side near its periphery, which is engaged by a pinion 136 mounted on the shaft 117, as shown in Fig. 3. As best shown in Fig. 3, the turntable 134 rests upon a double series of anti-friction rollers 137—138,—said rollers being arranged in pairs upon spindles 139, the ends of said spindles being fitted in inner and outer rings 140—141, respectively, which serve to hold the rollers in position. Said rollers travel upon the upper surface of a bearing-plate 142 mounted on suitable standards 143 carried by a bed-plate 144, as shown in Figs. 1 and 3.

145 indicates a series of curved plates, which depend from the under surface of the turntable 134. Said plates are arranged at intervals around the turntable,—four preferably being provided ninety degrees apart,—and they extend down below the outer edge of the upper portion of the bearing-plate 142, as shown in Fig. 3.

147 indicates locking-plates, secured to the lower ends of the plates 145 by bolts 146,—which locking-plates project under the outer edge of the bearing-plate 142, as shown in Fig. 3, said bearing-plate being provided with an annular extension 148 under which said plates 147 project, as shown. By this construction accidental displacement of the members of the turntable is prevented.

As shown in Fig. 5, the turntable 134 is provided with a central opening for the passage of the well-tube 52,—the gripping-devices being arranged at opposite sides of said opening.

149—150 indicate posts, which are carried by the turntable and rise therefrom at diametrically opposite points, as best shown in Figs. 1 and 5. The lower portions of said posts are enlarged, as shown at 151—152 in Fig. 1, and upon said enlarged portions or bases rest bumpers or cushions 153—154 formed of wooden blocks or other suitable material. The object of the bumpers 153—154 is to deaden the shock of the gripping-devices when the well-tube is jumped, as will be hereinafter described. 155—156 indicate the members of a guide and brace, which connect the upper ends of the posts 149—150 and embrace the well-tube, as best shown in Figs. 1 and 4. The outer ends of said braces are pivotally mounted upon the upper ends of the posts 149—150,—being held in place by nuts 157. The inner ends of said braces are curved in a semicircular form and overlap each other, as best shown in Fig. 4, forming an annular frame around the well-tube 52. Pins 158—159 removably connect the members of the brace together, as shown in Figs. 1 and 4. By removing the pins 158—159 the members of the brace may be separated for the removal of the well-tube.

160—161 indicate traveling frames, which are mounted on the posts 149—150, respectively, and are adapted to travel vertically thereupon. Said frames are provided with anti-friction rollers 162—163 adapted to bear against the opposite sides of each of said posts, as shown in Fig. 5, so that said frames may move readily thereupon. Each of said frames 160—161 is provided with rods 164—165, which extend in opposite directions and are screw-threaded at their outer ends, and with hand-wheels 166—167 upon the screw-threaded portions of said rods for tightening and loosening the gripping-devices, as will be hereinafter described.

168—169 indicate bearing-blocks, pivoted upon the smooth inner portions of the rods 164—165.

170 indicates springs between the frames 160—161 and said bearing-blocks, as shown in Fig. 5.

171 indicates lugs carried by the bearing-blocks 169 near their outer ends, as shown in Fig. 6.

172—173 indicate swinging-frames, which carry gripping-devices as will be hereinafter described. Each of said frames is provided with pivots 174 at its ends, which pivots are adapted to fit into suitable recesses provided in the ends of the bearing-blocks 168—169, as shown in Figs. 5 and 6; so that the inner ends of said frames are free to swing upward upon said pivots. To prevent the inner ends of said frames from swinging downward below a substantially horizontal position, each of said frames is provided with a lug 175 adapted to engage the lug 171 on its bearing-block 169, as best shown in Figs. 5 and 6. Each of said frames 172—173 is provided with inwardly-projecting arms 176—177 adapted to receive pivot-pins 178, in which are mounted large and small rollers 179—180 having sharp edges for gripping the pipe. Between each pair of arms 176—177 is a shorter arm 181, which forms an intermediate bearing for the pivot-pins 178,—thus securing greater strength.

As best shown in Fig. 5, the frames 172—173 are arranged at opposite sides of the well-tube and are supported through the bearing-blocks 168—169 by the rods 164—165. Consequently, by adjusting the hand-wheels 166—167 the gripping-devices may be caused to grip the pipe more or less tightly. The springs 170 serve to move the gripping-devices outward. Furthermore, the gripping-devices are free to move vertically toward or from the turntable with the pipe, since the frames 160—161 ride freely upon the posts 149—150. In jumping the pipe it is raised by means of the hoisting-mechanism and then released, so as to drop suddenly into the well; and it is desirable that in jumping, the well-tube, which carries the bearing-bit, be rotated so as to strike in a new place when dropped. This is accomplished by the apparatus above described, since the gripping-devices carried by the frames 160—161 are caused to rotate with the turntable by means of their engagement with the posts 149—150. The generic invention involved is not herein claimed, since it is included in my Patent No. 775,417 above referred to,—the invention of my present application having to do only with such features as are not claimed in my said patent.

182—183 indicate frames, arranged at opposite sides of the turntable and provided with gripping-rollers 184—185 mounted on transverse shafts 186—187 carried by arms 188—189, as shown in Fig. 8. The arms 188—189 are carried, respectively, by sleeves 190—191 mounted upon and keyed to shafts 192—193, respectively, which are mounted in suitable bearings 194—195 carried, respectively, by the frames 182—183, as shown in Fig. 8. By rocking the shafts 192—193 the shafts 186—187 may be swung upward and outward from the well-tube.

196—197 indicate springs on the sleeves 190—191, respectively, for holding the shafts 186—187 in operative position.

198 indicates a shaft, mounted in suitable bearings 199—200 at one end of the frames 182—183,—which shaft carries near its ends beveled gears 201—202 which are keyed thereupon and mesh with beveled pinions 203—204 mounted on the ends of the shafts 192—193, respectively, as shown in Fig. 8. By rotating the shaft 198 the sleeves 190—191 may be rocked to adjust the position of the gripping-devices carried thereby. The beveled pinions 201—202 are mounted on feathers on the shaft 198, to permit longitudinal movement of said pinions when the frames 182—183 are adjusted toward and from the well-tube, as hereinafter described.

205—206 indicate shafts at opposite ends of the frames 182—183, for adjusting said frames toward and from the well-tube. As shown in Fig. 8, the ends of said shafts 205—206 are screw-threaded, and the ends of the frames 182—183 are provided with blocks 207 which fit upon the screw-threaded portions of said shafts. The screw-threads at the ends of each shaft 205—206 are oppositely arranged, so that by rotating said shafts the frames 182—183 are moved simultaneously in opposite directions,—moving toward or from the center of the turntable, according as said shafts are rotated in one direction or the other. Said shafts are provided with squared portions 208 at their centers, to provide for the application of a tool for rotating them. 209 indicates coupling-disks at the ends of the shafts 205—206, and 210 coupling-rods connecting the disks of said shafts, so that said shafts are compelled to rotate in unison. Said rods are provided with sleeves 211 at their ends, which fit over crank-pins 212 carried by said shafts, as shown in Figs. 1 and 8. The gripping-devices just described are mounted directly upon the turntable and do not move vertically except as they rock about the shafts 192—193.

As best shown in Fig. 3, two sets of gripping-rollers 184—185 are carried by each of the frames 182—183,—the two sets of rollers carried by each frame being mounted upon parallel shafts carried by side plates 213 which are pivotally connected to the arms 188 or 189 of their respective frames 182—183 by shafts 214, best shown in Fig. 3. By this construction the two sets of gripping rollers carried by each frame may rock about the shaft 214, by which they are supported; and consequently they automatically adjust themselves to inequalities in the surface of the well-tube. This construction also, by providing for a greater number of gripping-devices, affords a more secure engagement between the gripping-devices and the well-tube. The frames 182—183 are held down upon the turntable and guided thereupon by guide-strips 215 having ribs 216 which project over marginal flanges 217 carried by the frames 182—183, as shown in Fig. 13. While I prefer this form of guide, any other suitable construction may be employed.

In the operation of sinking wells it is sometimes desirable to grip the well-tube or boring-pipe in such manner as to prevent it from rotating, and also from descending,—as, for example, when a section has to be added or removed. In my improved apparatus I have provided retaining-means below the turntable for so gripping and holding the pipe,—said retaining-means being so disposed with reference to the turntable that the gripping-devices carried by the turntable may be employed for rotating an upper section to screw it to or unscrew it from a lower section while such lower section is held firmly by said retaining-means. The construction and arrangement of the retaining-devices is best shown in Figs. 3, 9, and 10.

218—219 indicate frames similar to the frames 182—183,—said frames being arranged at opposite sides of the well tube upon the bed-plate 144 and being movable toward and from the well-tube upon screw-threaded shafts 220—221, as shown in Fig. 3. The rods 220—221 correspond with the shafts 205—206 which carry the frames 182—183 and are connected at their ends by connecting-rods 222 in a similar manner, so that they rotate in unison. By rotating the shafts 220—221 the retaining-devices carried by the frames 218—219 may be caused to grip or release the well-tube, as desired.

224—225 indicate retaining-blocks, which are pivotally mounted upon shafts 226—227 carried, respectively, by rocking-supports 228—229 mounted on shafts 230—231, respectively, journaled in the frames 218—219, as shown in Fig. 9. Springs 232 serve to hold the rocking-supports 228—229 normally in operative position,—that is to say, with the blocks 224—225 in engagement with the well-tube. The upper faces of the blocks 224—225 are best shown in Fig. 10, from which it will be seen that each of said blocks is provided with a series of horizontal serrations 233 and a series of vertical serrations 234 adjacent thereto,—the horizontal serrations serving to prevent endwise movement of the article gripped, while the vertical serrations prevent rotary movement thereof. Accordingly when the blocks 224—225 are in engagement with the well-tube it is retained in a fixed position, and can neither ascend, descend, or rotate.

As best shown in Fig. 3, the rocking-supports 228—229 are so constructed and arranged that when the blocks 224—225 engage the well-tube said supports have an inclined or angular relation to said blocks, so that by swinging said supports a toggle action is secured, by which the retaining-blocks may be forced tightly into engagement with the well-tube. The supports 228—229 are rocked to cause the retaining-blocks 224—225 to engage or disengage the well-tube by means of a lever 235, operating through a shaft 236 provided near its ends with beveled pinions 237 meshing with beveled pinions 238 carried by the shafts 230—231, respectively, as shown in Fig. 9. The pinions 237 are mounted on feathers on the shaft 236, so that they may move longitudinally thereof, and are held in mesh with the pinions 238 by brackets 239—240 carried by the frames 218—219, as shown in Fig. 9. The pinions 237 at the opposite ends of the shaft 236 are reversed, so that by rocking the shaft 236 the blocks 234—235 are simultaneously moved toward or from the well-tube, as the case may be.

The lever 235 is operatively connected to the shaft 236 by means of a ratchet-wheel 241 and a double-acting pawl 242, best shown in Figs. 11 and 12,—said pawl being arranged to engage said ratchet-wheel when said lever is moved in either direction; so that by operating said lever the shaft 236 may be rotated either to cause the blocks 224—225 to engage the well-tube or to disengage the same. This operation is secured by rigidly connecting the pawl 242 between its ends with the inner end of the lever 235, and pivoting said lever in swinging-links 243—244 which are mounted upon the shaft 236, as shown in Fig. 11. The pivot 245 of said lever, which is non-rotatably secured to said lever in said suitable way, is extended at one end and bent to form a crank 246, to which is connected one end of a spring 247, as shown in Fig. 11,—the other end of said spring being connected to a pin 248 carried by a nextended portion 249 of the link 244. The arrangement is such that the crank-arm 246 is at its greatest distance from the pin 248 when the pawl 242 is in its operative position, shown in Fig. 12,—the lever 235 being at that time in line with the links 243—244. When, however, the lever 235 is rocked to cause one of the ends of the pawl 242 to engage the ratchet-wheel 241, the crank 246 is thrown out of line with the link 244, and the spring 247 accordingly acts to hold the pawl in operative position. The above action takes place in whichever direction the lever 235 is moved, so that said lever may be employed to move the retaining-blocks 224—225 in either direction. By providing the retaining-devices below the turntable as described, the operation of sinking wells is greatly facilitated, since the well-tube may readily be held in a fixed position for any desired purpose,—such as for adding or removing a length of pipe.

While I have described specifically the construction illustrated in the accompanying drawings, I wish it to be understood that my invention is not restricted to such details of construction, except in so far as they are particularly claimed, but includes, generically, the subject-matter of the broader claims.

That which I claim as my invention and desire to secure by Letters Patent is,—

1. In a well-sinking apparatus, the combination of a turntable, means carried thereby adapted to grip the pipe for rotating the same, posts carried by said turntable, and means connected to said posts for embracing and guiding the pipe, substantially as described.

2. In a well-sinking apparatus, the combination of a turntable, means carried thereby adapted to grip the pipe for rotating the same, posts carried by said turntable, swinging-arms mounted on the upper ends of said posts, the inner portions of said arms being semicircular and being arranged to overlap, and pins connecting the overlapping portions of said arms together, substantially as described.

3. In a well-sinking apparatus, the combination of a turntable having vertically-disposed posts, frames mounted on said posts and movable longitudinally thereof, and swinging-frames supported by said longitudinally-movable frames, said swinging-frames having gripping-devices adapted to grip the pipe for rotating the same, substantially as described.

4. In a well-sinking apparatus, the combination of a turntable having vertically-disposed posts, frames mounted on said posts and movable longitudinally thereof, rods carried by said frames and projecting therefrom in opposite directions, and swinging-frames pivotally supported by said rods, said swinging-frames having gripping-devices adapted to grip the pipe for rotating the same, said swinging-frames being adjustable toward and from said longitudinally-movable frames, substantially as described.

5. In a well-sinking apparatus, the combination of a turntable, vertically-disposed posts carried thereby, frames mounted upon said posts and movable longitudinally thereof, rods carried by said frames and projecting horizontally in opposite directions, bearing-blocks mounted on said rods, swinging-frames mounted in said bearing-blocks, and gripping-devices carried by said swinging-frames and adapted to engage the pipe for rotating the same, substantially as described.

6. In a well-sinking apparatus, the combination of a turntable, vertically-disposed posts carried thereby, frames mounted upon said posts and movable longitudinally thereof, rods carried by said frames and projecting horizontally in opposite directions, bearing-blocks mounted on said rods, swinging-frames mounted in said bearing-blocks, gripping-devices carried by said swinging-frames and adapted to engage the pipe for rotating the same, and means for preventing said swinging-frames from moving down below a substantially horizontal position, substantially as described.

7. In a well-sinking apparatus, the combination of a turntable, vertically-disposed posts carried thereby, frames mounted upon said posts and movable longitudinally thereof, rods carried by said frames and extending horizontally in opposite directions, swinging-frames supported by said rods, means carried by said swinging-frames adapted to engage and grip the pipe for rotating the same, means screw-threaded upon the outer ends of said rods for adjusting the position of said swinging-frames, and springs mounted on said rods between said swinging-frames and said longitudinally-movable frame, substantially as described.

8. In a well-sinking apparatus, the combination of a turntable, means mounted thereupon for engaging and gripping the pipe for rotating the same, and means connected with said turntable and movable vertically independently thereof for engaging and gripping the pipe for rotating the same, substantially as described.

9. In a well-sinking apparatus, the combination of a turntable, and a plurality of gripping-mechanisms carried by said turntable for engaging and gripping the pipe for rotating the same, one of said mechanisms being vertically movable with the pipe independently of said turntable, meanwhile rotating with said turntable, substantially as described.

10. In a well-sinking apparatus, the comnation of a turntable, vertically-disposed posts carried thereby, means mounted on said posts adapted to engage end grip the pipe for rotating the same and being movable vertically with the pipe independently of said turntable, and additional gripping-means mounted on said turntable for engaging and rotating the pipe, substantially as described.

11. In a well-sinking apparatus, the combination of vertically-adjustable means for gripping a boring-pipe for rotating it, said boring-pipe being movable endwise independently of said gripping-means, and stationary gripping-means for gripping the boring-pipe for rotating it, substantially as described.

12. In a well-sinking apparatus, the combination of a turntable, stationary gripping-means, carried thereby adapted to grip the pipe for rotating it, and vertically-movable gripping-means supported by said turntable and adapted to grip the pipe for rotating it, substantially as described.

13. In a well-sinking apparatus, the combination of a turntable, stationary gripping-means carried thereby adapted to grip the pipe for rotating it, swinging-frames connected with said turntable and movable vertically independently thereof, and gripping-means carried by said frames adapted to engage the pipe for rotating it, substantially as described.

14. In a well-sinking apparatus, the combination of a turntable, gripping-means carried thereby adapted to grip a round pipe for rotating it, meanwhile permitting endwise movement thereof, and retaining-means below said turntable adapted to grip said pipe for holding it against rotary and vertical movement, substantially as described.

15. In a well-sinking apparatus, the combination of a turntable, gripping-means carried thereby adapted to grip a round pipe for rotating it, meanwhile permitting endwise movement thereof, retaining-means below said turntable adapted to grip said pipe for holding it against rotary and vertical movement, and rocking-supports for said retaining-means, substantially as described.

16. In a well-sinking apparatus, the combination of a turntable, gripping-means carried thereby adapted to grip the pipe for rotating it, meanwhile permitting endwise movement thereof, retaining-means below said turntable adapted to engage said pipe for holding it against rotary and vertical movement, rocking-supports for said retaining-means, and ratchet-mechanism for moving said retaining-means into and out of operative position, substantially as described.

17. In a well-sinking apparatus, the combination of retaining-blocks adapted to engage the pipe for preventing movement thereof, swinging-supports for said blocks, a ratchet-wheel for adjusting the position of said swinging-supports, an operating lever, and a double-acting pawl connected with said lever for rotating said ratchet-wheel in either direction, substantially as described.

18. In a well-sinking apparatus, the combination of retaining-blocks adapted to engage the pipe for preventing movement thereof, swinging-supports for said blocks, a ratchet-wheel for adjusting the position of said swinging-supports, an operating lever, a double-acting pawl connected with said lever for rotating said ratchet-wheel in either direction, and a spring for holding said pawl in engagement with the ratchet-wheel when said lever is operated, substantially as described.

19. In a well-sinking apparatus, the combination of a turntable, means carried thereby adapted to grip the pipe for rotating the same, posts carried by said turntable, and swinging arms mounted on the upper ends of said posts and forming an opening to permit the passage of the well-tube, substantially as described.

20. In a well-sinking apparatus, the combination of a turntable, gripping means carried thereby adapted to grip a round pipe for rotating it, meanwhile permitting endwise movement thereof, and retaining means independent of the turntable adapted to grip said round pipe for holding it against rotary and vertical movement, said retaining means being movable out of operative position.

MATTHEW THOS. CHAPMAN.

Witnesses:
   MINNIE A. HUNTER,
   ALBERT H. ADAMS.